United States Patent [19]

Hanada

[11] Patent Number: 4,723,223

[45] Date of Patent: Feb. 2, 1988

[54] DIRECT MEMORY ACCESS CONTROLLER FOR REDUCING ACCESS TIME TO TRANSFER INFORMATION FROM A DISK

[75] Inventor: Masayuki Hanada, Kamakura, Japan

[73] Assignee: Kabushiki Kaisha Toshiba, Kawasaki, Japan

[21] Appl. No.: 731,941

[22] Filed: May 8, 1985

[30] Foreign Application Priority Data

May 8, 1984 [JP] Japan .................. 59-91221

[51] Int. Cl.⁴ ................................. G06F 13/04
[52] U.S. Cl. .................................. 364/900
[58] Field of Search ........ 364/200, 900, 200 MS File, 364/ 900 MS File

[56] References Cited

U.S. PATENT DOCUMENTS

| | | | |
|---|---|---|---|
| 3,629,860 | 12/1971 | Capozzi | 364/200 |
| 3,829,837 | 8/1974 | Farr, Jr. | 364/200 |
| 4,138,732 | 2/1979 | Suzuki et al. | 364/900 |
| 4,232,365 | 11/1980 | Englund | 364/200 |
| 4,300,193 | 11/1981 | Bradley et al. | 364/200 |
| 4,399,503 | 8/1983 | Hawley | 364/200 |
| 4,400,772 | 8/1983 | Broyles et al. | 364/200 |
| 4,403,283 | 9/1983 | Myntti et al. | 364/200 |
| 4,425,615 | 1/1984 | Swenson et al. | 364/200 |
| 4,490,782 | 12/1984 | Dixon et al. | 364/200 |
| 4,509,118 | 4/1985 | Shenk | 364/200 |
| 4,535,420 | 8/1985 | Fung | 364/900 |
| 4,543,626 | 9/1985 | Bean et al. | 364/200 |

*Primary Examiner*—Gary V. Harkcom
*Assistant Examiner*—Randy W. Lacasse
*Attorney, Agent, or Firm*—Finnegan, Henderson, Farabow, Garrett & Dunner

[57] ABSTRACT

A direct memory access controller, such as for a disk, includes address registers containing beginning and end addresses defining a transfer area of a disk, a location counter which points to a specific location which is being accessed in the transfer area, updating circuitry to set the location counter to the initial address after the location corresponding to the end address has been accessed, and termination circuitry for disabling the location counter when all of the memory locations of the transfer area have been accessed. The address initially loaded into the location counter is for the location which can be accessed most quickly by the direct memory access controller.

6 Claims, 4 Drawing Figures

F I G. 1
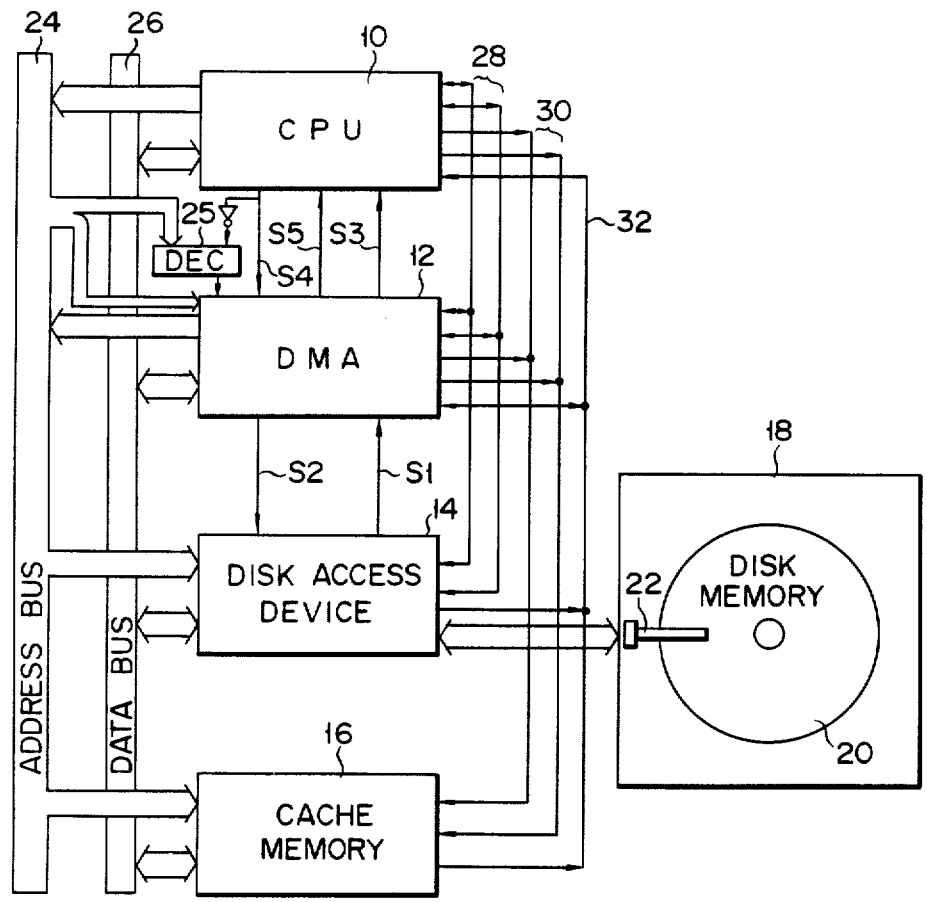

DIRECT MEMORY ACCESS CONTROLLER FOR REDUCING ACCESS TIME TO TRANSFER INFORMATION FROM A DISK

BACKGROUND OF THE INVENTION

The present invention relates to a data transfer control circuit and, more particularly, a data transfer circuit with can achieve DMA (direct memory access).

An intelligent disk memory system has a CPU, a DMA, a disk access device and a cache memory which are used to sequentially write pieces of data in a disk memory or sequentially read them from the disk memory. The cache memory has memory locations corresponding to one track of the disk memory. The CPU designates a part of the cache memory as a transfer area. The initial and end addresses of the transfer area are set in the DMA. The DMA controls the data transfer between the cache memory and the disk access device. The CPU instructs the disk access device to make an access to that part of the disk memory which corresponds to the transfer area. Once the disk access device has accessed said part of the disk, it drives a read/write head to write data in, or read data from the disk memory. The CPU may control the data transfer between the cache memory and an external computer. This control can be performed at any time, except when the DMA is operating.

The known DMA has two registers. The first register stores the initial address of the transfer area, and the second register stores the end address of the area. The data in the first register is supplied to the cache memory as a transfer address. It is incremented until it becomes equal to the data stored in the second register. When the transfer data are supplied to the cache memory, all memory locations of the transfer area are designated in preparation of the data transfer. For example, when the initial address data specifies one of the memory locations in order to write data from this location to the disk memory, the data is supplied to the disk access device. The read/write head is driven, thus writing the data in said portion of the disk memory. Upon completion of the data transfer, the data in the first register of the DMA is incremented.

With the disk memory system, however, the data transfer between the disk and cache memory cannot often be started immediately after the disk access device has received an access instruction from the CPU. This is because the disk access device must wait until the head reaches a specified part of the rotating disk memory (i.e., the portion corresponding to the initial address of the transfer area). When the disk memory is a floppy disk, it needs about 167 ms to rotate once. This time is extremely long in terms of the operation speeds of the CPU, DMA and cache memory. While the DMA is not operating, the CPU can process a considerably large amount of data.

The setup time, which lapses after the disk access device has received an access instruction until the data writing or reading of the disk starts, is determined by the distance between the read/write head and the specified part of the disk. When this distance is long, the setup time is proportionally long, and the data is inevitably transferred at low speed between the cache memory and the disk memory.

SUMMARY OF THE INVENTION

The object of this invention is to provide a data transfer control circuit which can reduce the loss of speed of actual data transfer.

According to the invention, there is provided a data transfer control circuit comprising: a first register for storing an initial address of a transfer area of a cache memory, the cache memory having a plurality of memory locations; a second register for storing an end address of the transfer area; a third register for supplying a stored address to the cache memory in response to a transfer request, a given address of a memory location of the transfer area being preset in said third register; an update section for changing the address in the third register to a subsequent address after said third register supplies the cache memory with an address different from that stored in the second register and for setting the address stored in first register in the third register after the third register supplies the cache memory with the same address as stored in the second register; and a detecting circuit for detecting that the address in the third register has been updated the number of times which is equal to the number of the memory locations of the transfer area to generate a detection signal.

BRIEF DESCRIPTION OF THE DRAWINGS

FIG. 1 is a block diagram for explaining an intelligent disk memory system including a data transfer control circuit according to this invention;

DETAILED DESCRIPTION OF THE PREFERRED EMBODIMENT

Figure 2:
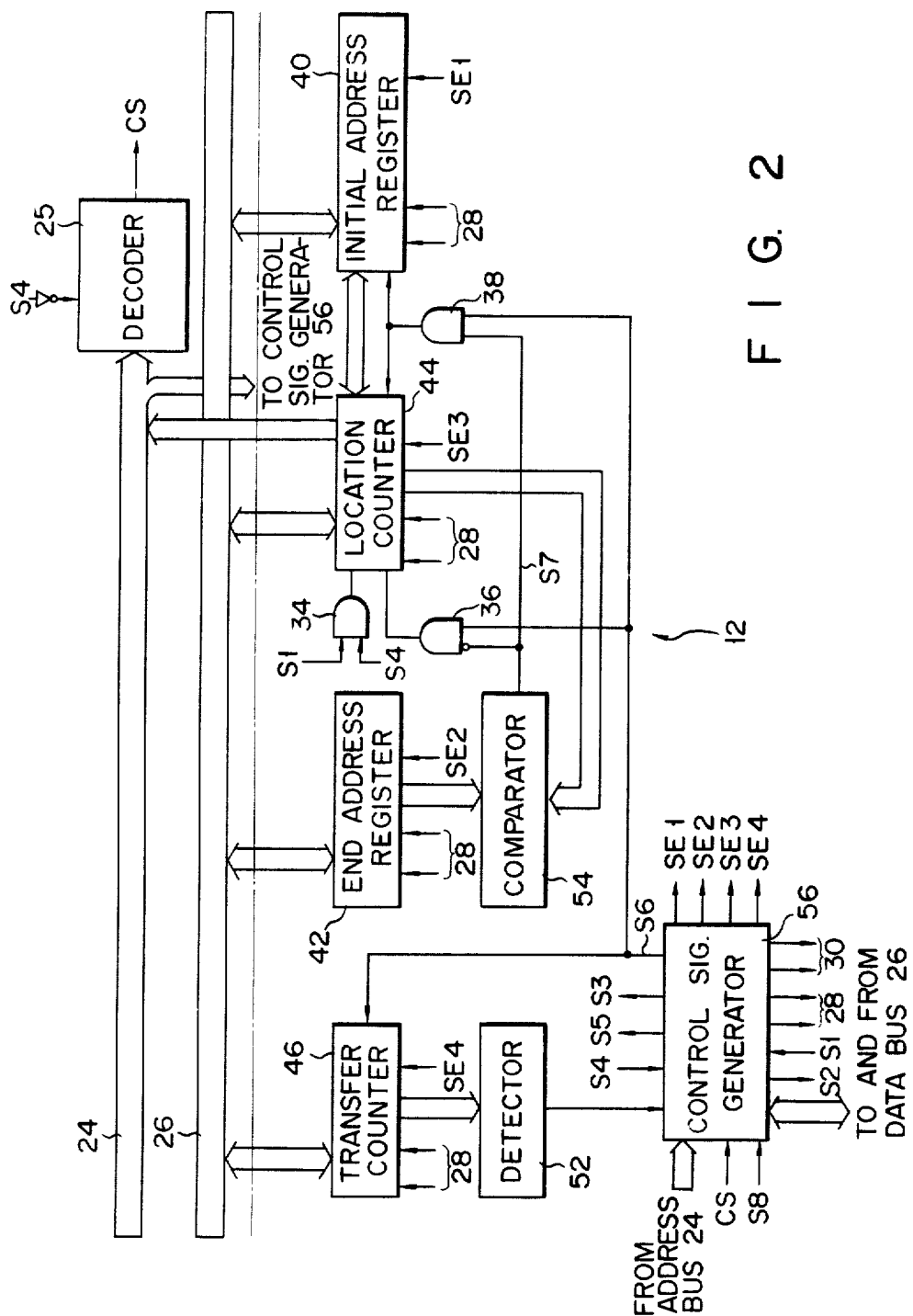
FIG. 2 is a circuit diagram of the DMA 12 used in the circuit of FIG. 1.

A data transfer control circuit, i.e., one embodiment of the invention, will be described with reference to FIGS. 1 and 2. FIG. 1 schematically shows an intelligent disk memory system in which the control circuit is used. This system comprises a CPU 10, a DMA 12, a disk access device 14, a cache memory 16 and a disk drive unit 18. A disk memory 20, e.g., a magnetic disk, is inserted in disk drive unit 18. Disk memory 20 is rotated in a predetermined direction so that data may be written in it or may be read from it. Disk memory 20 has a plurality of concentric tracks, each consisting of a plurality of sectors. Each sector has an index field and a data record section in series. The address of the sector is stored in the index field, and words can be recorded in the record section in series.

Disk drive unit 18 has a read/write head 22. Head 22 can move in the radial direction of disk memory 20 to magnetically write data in memory 20 or magnetically read data from memory 20.

Disk access device 14 reads the address from the index field of any sector of memory 20 via head 22 and then writes data in, or read data from, the record section of the sector through head 22. DMA 12 and disk access device 14 have their own I/O addresses, and can therefore recognize any instruction or any data they receive.

Cache memory 16 has memory locations. The memory capacity of cache memory 16 corresponds to that of, for example, one track of disk memory 20. CPU 10, DMA 12, disk access device 14, cache memory 16 are coupled to one another through an address bus 24 (e.g., 16 bits) and a data bus 26 (e.g., 8 bits). A decoder 25 decodes the address signal of 13 bits to activate DMA 12. Further, CPU 10, DMA 12 and device 14 are directly connected by a first pair of control lines 28 and ready line 32. CPU 10, DMA 12 and cache memory 16 are directly coupled by a second pair of control lines 30 and by a ready line 32. The input data from an external computer system (not shown) is supplied to cache memory 16 via data bus 26, and data read from memory 16 is supplied to the computer system via data bus 26. CPU 10 designates part of cache memory 16 as a transfer area and decides the part of disk memory 20 corresponding to the transfer area. CPU 10 presets the data about the transfer area in DMA 12 and supplies an access instruction to disk access device 14. The data preset in DMA 12 contains the initial and end addresses of the transfer area, the number of pieces of data to be transferred, and a transfer address of one memory location of the cache memory 16 to be designated first.

CPU 10 obtains from disk access device 14 the address of the sector of the disk memory 20 which can be accessed faster than any other sectors. CPU 10 calculates the distances between head 22 and those sectors of memory 20 which correspond to the transfer area. The memory location corresponding to the sector closest to head 22, which can thus be accessed faster than any other sector, is designated for the first data transfer.

Disk access device 14 generates a transfer request signal S1 in response to an access instruction from CPU 10. In response to an access enable signal S2, device 14 writes data in, or reads data from, memory 20 through the read/write head 22. When every piece of data is transferred, cache memory 16 supplies a ready signal S8 to DMA 12 via ready line 32.

DMA 12 outputs a hold request signal S3 during the receipt of signal S1 from disk access device 14. That is, DMA 12 stops producing signal S3 when the receipt of signal S1 is interrupted. DMA 12 generates an access enable signal S2 and the first transfer address in response to a hold enable signal S4 supplied from CPU 10. In response to signal S3, CPU 10 stops the use of address bus 24, data bus 26, and control lines 28 and 30, and generates a hold enable signal S4. Upon receipt of every ready signal S8, DMA 12 updates the transfer address. When a specified number of pieces of data are transferred, DMA 12 supplies a transfer end signal S5 to CPU 10.

To write data in disk memory 20, cache memory 16 receives the transfer address from DMA 12 via address bus 24 and also a read control signal from DMA 12 via control lines 30. Simultaneously, device 14 receives a write control signal from DMA 12 via control lines 28.

To read data from disk memory 20, device 14 receives a read control signal from DMA 12 via control lines 28. Cache memory 16 simultaneously receives the transfer address from DMA 12 via address bus 24 and also a write control signal from DMA 12 via control lines 30. DMA 12 stops generating the read and write control signal in response to the signal S8. Disk access device 14 stops producing signal S1 when read or write control signal is interrupted.

FIG. 2 shows DMA 12 in greater detail. As shown in this figure, DMA 12 includes an initial address register 40 and an end address register 42 for storing the initial and end addresses of the transfer area. DMA 12 also has a location counter 44 and a transfer counter 46. Counter 44 has a first storage section for storing one of the addresses the transfer area as the first transfer address. Counter 46 has a second storage section for storing the number of pieces of data to be transferred (i.e., the number of the memory locations forming the transfer area). A decoder 25 is connected to, for example, the higher thirteen bits of address bus 24 to generate a select signal CS in response to a specified address signal designating DMA 12. The signal CS is not produced when the hold enable signal S4 is not supplied to decoder 25.

Registers 40 and 42 and counters 44 and 46 are selected in response to decode signals SE1-SE4. A selected one of the registers 40 and 42 and counters 44 and 46 latches the data on data bus 26 under the control of the write control signal from control lines 28.

DMA 12 further comprises AND gates 34, 36 and 38, a detector 52, a comparator 54, and a control signal generator 56. Transfer request signal S1 and hold enable signal S4 are supplied to input terminals of AND gate 34. AND gate 34 generates an output instruction in response to the signals S1 and S4. This output instruction is supplied to location counter 44. In response to the output instruction, counter 44 transfers the contents of first storage section to cache memory 16 via address bus 24. Location counter 44 increments the same data by one, upon receipt of the output signal of AND gate 36. Transfer counter 46 decrements the contents of second storage section by one in response to update signal S6. Detector 52 is coupled to counter 46 to detect whether the contents in second storage section is "0" or not.

Comparator 54 is coupled to end address register 42 and location counter 44 to generate a coincidence signal S7 when the address stored in register 42 is identical with the address stored in the second storage section of counter 44. AND gate 36 outputs an signal in response to update signal S6 while comparator 54 is generating no coincidence signal. Conversely, AND gate 38 outputs an signal in response to update signal S6 while comparator 54 is generating coincidence signal S7.

Initial address register 40 transfers the address data to counter 44 in response to the output signal of AND gate 38. Location counter 44 latches this address data upon receiving the output signal of AND gate 38. Control signal generator 56 decodes the lower three-bit address in response to the select signal CS to generate decode signals SE1-SE4. Generator 56 outputs an hold request signal S3 when it receives transfer request signal S1, to thereby stop CPU 10. Generator 56 produces an access enable signal S2 in response to hold enable signal S4. Generator 56 latches the read/write mode data on data bus 26 upon receiving signal CS and a specific address in the lower three-bit address. In accordance with this mode data, generator 56 generates control signals (i.e., read and write control signals) to designate the direction in which data is to be transferred between disk access device 14 and cache memory 16. These control signals are supplied to cache memory 16 and disk access device 14 via control lines 28 and 30. Generator 56 outputs an update signal S6 when it receives ready signal S8 from cache memory 16.

The operation of the disk memory system shown in FIG. 1 will now be described. Disk memory 20 is rotated by disk drive unit 18 in one direction. CPU 10 supplies an address read command to disk access device 14. Device 14 reads the sector address from the sector of memory 20 to which read/write head 22 is opposing. This sector address is supplied to disk access device 14 and is updated by the movement of disk memory 20.

CPU 10 supplies the initial and end addresses of the transfer area to the registers 40 and 42 of DMA 12. It also supplies the number of data words to transfer counter 46. CPU 10 also finds the sector which can be accessed by disk access device 14 faster than any other sectors. It compares the address of this sector with the positions of the locations forming the transfer area of memory 16, and designates, as the first transfer address, the address of the location which can be accessed within the shortest possible time. The first transfer address is set in the location counter 44 of DMA 12.

Thereafter, CPU 10 supplies an access instruction to disk access device 14, so that data may be written into, or read from, the sector of disk memory 20 specified by the first transfer address. Disk access device 14 generates a transfer request signal S1 when read/write head 22 faces the record section of the specified sector. (If head 22 faces the record section when disk access device 14 receives the access instruction, device 14 outputs signal S1 immediately.)

In response to signal S1, DMA 12 generates a hold request signal S3 to CPU 10. When CPU 10 receives this signal, it stops the use of address bus 24, data bus 26, and control lines 28 and 30 (CPU 10 cannot control the data transfer between cache memory 16 and the external system), and then outputs and supplies a hold enable signal S4 to DMA 12. Upon receiving signal S4, DMA 12 supplies the transfer address from location counter 44 to cache memory 16 via address bus 24. Control signal generator 56 outputs two control signals determining the direction of data transfer. These control signals are supplied to disk access device 14 and cache memory 16 via control lines 28 and 30.

More specifically, to read data from disk memory 20, a read control signal is supplied to disk access device 14 via the first pair of control lines 28, and a write control signal is supplied to cache memory 16 via the second pair of control lines 30. Device 14 reads the data from the record section of the specified sector through read/write head 22. This data is fed to cache memory 16 via data bus 24 and stored in the memory location of memory 16.

When cache memory 16 generates a ready signal S8, control signal generator 56 stops producing the read and write control signals. Then, disk access device 14 stops generating the signal S1. Generator 56 stops generating the hold request signal S3. Location counter 44 stops supplying the transfer address. Generator 56 then supplies update signal S6 to transfer counter 46 and AND gates 36 and 38. At this time, comparator 54 compares the address in end address register 42 with the address in access location counter 44. If the compared addresses are not identical, the address in counter 44 is incremented by one, and the address in transfer counter 46 is decremented by one. Detector 52 detects whether the contents of counter 46 is "0" or not. Location counter 44 supplies the incremented transfer address to cache memory 16 each time it receives a hold enable signal S4.

When the address in location counter 44 becomes equal to the address in end address register 42, comparator 54 outputs a coincidence signal S7. Signal S7 is inverted and supplied to AND gate 36. It also is supplied to AND gate 38 without being inverted. Generator 56 generates an update signal S6, whereby the address stored in location counter 44 is changed to the same address as stored in initial address register 40. That is, after supplying the end address of the transfer area to cache memory 16, location counter 44 starts sequentially supplying the initial address of the transfer area and the subsequent addresses thereof.

When the contents of transfer counter 46 are reduced to "0," detector 52 detects this and supplies a detection signal to control signal generator 56. In response to this signal, generator 56 supplies data transfer end signal S5 to CPU 10.

In the disk memory system described above, data can be read from disk memory 20 to disk access device 14 and can then be transferred from device 14 to cache memory 16. When a specified location of cache memory 16 stores one word, ready signal S8 is supplied from cache memory 16 to DMA 12. In response to signal S1, the control signal generator 56 of DMA 12 stops generating hold request signal S3. In other words, CPU 10 regains, from DMA 12, the right to use address bus 24, data bus 26 and control lines 28 and 30. Hence, CPU 10 can perform any desired operation while disk access device 14 is reading the next data from disk memory 20. This condition lasts until control signal generator 56 generates hold request signal S3 in response to signal S1 after the updating the location counte 44.

Disk access device 14 can quickly respond to an access instruction to write data in, or read data from disk memory 20. Data is read from the record sections of some specified sectors in the following manner. If read/write head 22 does not face any specified sector when disk access device 14 receives an access instruction, it cannot read the data immediately. Head 22 must wait until disk memory 20 rotates so that the record section of the specified sector comes to oppose head 22. On the other hand, if head 22 opposes the leading part of the recording section of any specified sector when device 14 receives the access instruction, it can immediately start reading data from the recording section of the sector. Further, if head 22 opposes any specified sector but does not oppose the leading part of the record section thereof, it waits until the record section of the next specified sector come to face it. With the disk memory system of this invention, data can be read from, or written in, one track of disk memory 20 within a period of time which disk memory 20 requires to rotate once.

In the conventional disk memory system, data must be read from, or written in, the record section of the first of the specified sectors. For this reason, not only the time required to read data from, or write it from the specified sectors but also the time required for disk memory 20 to rotate 0° to 360° is required to read data from, or write it from the specified sectors. The average of the time which memory 20 requires to rotate 0° to 360° is of course the time it needs to rotate 180°, which is 80 ms or more. In view of this, the present invention can save much time in reading or writing data.

Figure 3:
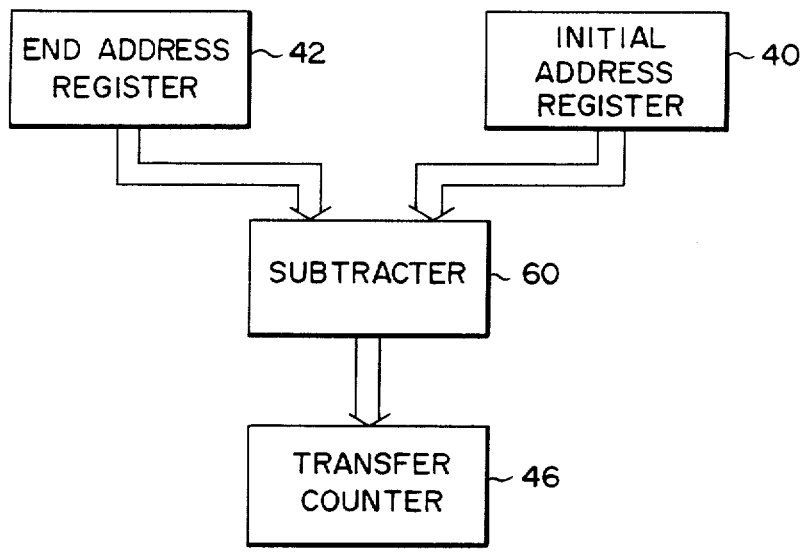
FIG. 3 shows another embodiment of the invention using a subtracter.

In the embodiment described above, CPU 10 sets the number of memory locations of transfer area in transfer counter 46. Instead, as shown in FIG. 3, subtracter 60 may be provided in DMA 12, which sets the number of memory locations of the transfer area in transfer counter 46 in accordance with addresses stored in initial address register 40 and end address register 42. In this case, the operation of CPU 10 can be simplified.

Figure 4:
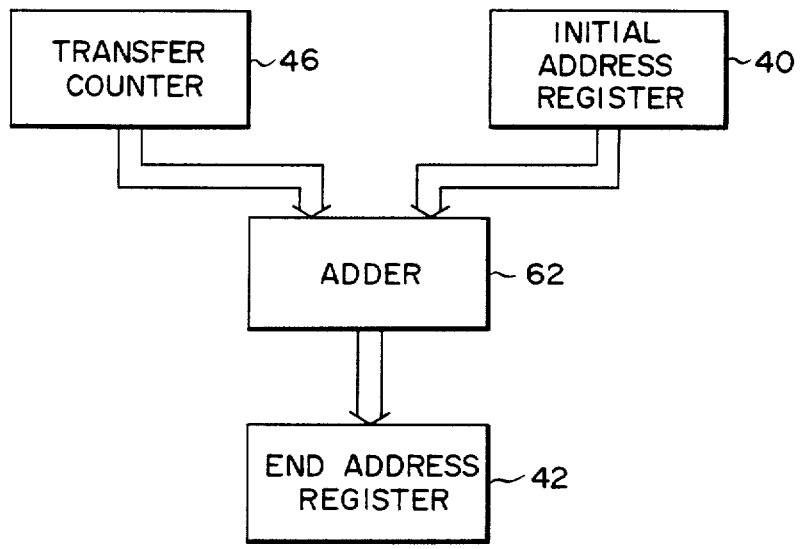
FIG. 4 shows another embodiment of the invention using an adder.

In the above embodiment, CPU 10 sets the end address in end address register 42. Instead, as shown in FIG. 4, an adder 62 may be incorporated in DMA 12, which sets the end address of the transfer area in register 42 in accordance with the address and number data stored in initial address register 40 and transfer counter 46. This can simplify the operation of CPU 10.

Moreover, the initial count of location counter 44 may be determined by the addressing of the memory locations of cache memory 16. Instead of being incremented, the count of counter 44 may be decremented by one each time. In this case, comparator 54 compares the addresses stored in counter 44 and initial address register 40. The address, which is in end address register 42 when the compared addresses are found identical, must be set in location counter 44.

In the above embodiment, control signal generator 56 stops generating hold request signal S3 every time it receives signal S1. Generator 56 may be designed to stop generating signal S3 after detector 52 has output a detection signal, when disk access device 14 can read data from memory 18 at high speed.

What is claimed is:

1. A direct memory access controller for controlling data transferred to and from a rotational storage device containing serially-ordered memory locations, said controller comprising:

first and second address registers containing beginning and end addresses, respectively, of a serial portion of said rotational storage device, said beginning and end addresses defining a transfer area in said controller for the transfer of data between said storage device and said controller;

pointer means for storing an address indicative of a location in said transfer area currently being accessed, said pointer means including means for initially loading into said pointer means a value representing the one of said memory locations in said serial portion of said rotational storage device which can be accessed most quickly by said direct memory access controller, and means for modifying said address in said pointer means each time data is transferred between said transfer area said serial portion of said storage device;

update means, coupled to said address registers, for changing the address in said pointer means to said beginning address after the address in said pointer means becomes equal to said end address; and terminating means for disabling said pointer means after all of said data has been transferred between the transfer area and the serial portion.

2. A direct memory access controller according to claim 1 wherein said update means includes a comparator having inputs coupled to said pointer means and to said second address register, and activating a comparison signal at an output when the address stored in said pointer means is equal to said end address, and an update circuit, coupled to the output of said comparator, for loading said pointer means with said beginning address when said comparison signal is activated.

3. A direct memory access controller according to claim 2 wherein said terminating means includes a transfer counter, coupled to said pointer means, for holding a value representing the number of memory locations in said transfer area for which data transfer with said serial portion is yet to occur, said transfer counter including means for initially loading said transfer counter with a value representing the total number of said memory locations in said transfer area, means for decrementing said transfer counter by one each time data is transferred between said serial portion and said transfer area, and a detector, coupled to said transfer counter, for detecting when said transfer counter decrements to zero.

4. A direct memory access controller according to claim 3 wherein said pointer means includes means for initially loading said initial address in response to a ready signal, and wherein said means for initially loading said initial address in said transfer counter includes means responsive to said ready signal, for loading said value representing said total number of memory locations in said transfer area.

5. A direct memory access controller according to claim 3 wherein said transfer counter further includes means for determining said total number of memory locations in said transfer area in accordance with the addresses in said first and second address registers.

6. A direct memory access controller according to claim 3 further including means for adding the address in said first address register and the value initially loaded into said transfer counter and for setting the resulting sum corresponding to the end address for said transfer area into said second address register.

* * * * *